US012276292B2

(12) United States Patent
Parsons et al.

(10) Patent No.: US 12,276,292 B2
(45) Date of Patent: Apr. 15, 2025

(54) DUAL DIRECTION FLOW RESTRICTOR

(71) Applicant: HONEYWELL INTERNATIONAL INC., Charlotte, NC (US)

(72) Inventors: Abigail Parsons, South Bend, IN (US); Sammuel Tillich, South Bend, IN (US); Anthony Rulli, South Bend, IN (US); Matthew Arend, South Bend, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 308 days.

(21) Appl. No.: 17/931,185

(22) Filed: Sep. 12, 2022

(65) Prior Publication Data

US 2024/0084830 A1 Mar. 14, 2024

(51) Int. Cl.
*F15D 1/02* (2006.01)

(52) U.S. Cl.
CPC .................................... *F15D 1/025* (2013.01)

(58) Field of Classification Search
CPC ...................................................... F15D 1/025
USPC ........................................................... 138/44
See application file for complete search history.

(56) References Cited

U.S. PATENT DOCUMENTS 3,072,261 A 1/1963 Smith
3,077,903 A 2/1963 Honsinger
3,109,459 A * 11/1963 Lee, II .................... F15B 21/00 138/40
3,630,444 A 12/1971 Nelson
3,630,455 A 12/1971 Parkison
4,171,209 A * 10/1979 Brown .................... F16L 55/09 210/450
4,266,576 A 5/1981 Bradford
4,653,291 A * 3/1987 Moeller .................. F25B 41/38 138/44
4,926,658 A * 5/1990 Olsen ...................... F25B 41/38 137/513.3
5,031,416 A * 7/1991 Drucker .................. F25B 41/38 62/324.1
5,038,579 A * 8/1991 Drucker .................. F25B 41/38 137/493.9
5,123,452 A 6/1992 Leblanc
5,134,860 A * 8/1992 Drucker .................. F25B 41/38 137/513.3
5,341,656 A * 8/1994 Rust, Jr. .................. F25B 41/38 62/504

(Continued)

FOREIGN PATENT DOCUMENTS

CN 202037851 U 11/2011
CN 203891849 U 10/2014

(Continued)

*Primary Examiner* — David R Deal
(74) *Attorney, Agent, or Firm* — Lorenz & Kopf LLP

(57) ABSTRACT

A flow restrictor includes a first flowbody defining a first end portion, a second end portion opposite the first end portion and an orifice between the first end portion and the second end portion. The first end portion defines a plurality of first slots, and the second end portion defines a counterbore having a first diameter. The flow restrictor includes a second flowbody defining a plurality of second slots and having a second diameter proximate the plurality of second slots that is greater than the first diameter of the first flowbody. The second flowbody is configured to be received within the counterbore of the first flowbody.

20 Claims, 9 Drawing Sheets

(56) References Cited

U.S. PATENT DOCUMENTS

| | | | | |
|---|---|---|---|---|
| 5,511,585 | A * | 4/1996 | Lee, II | F16L 55/10 138/44 |
| 5,706,670 | A * | 1/1998 | Voorhis | F25B 41/38 62/324.6 |
| 5,803,119 | A | 9/1998 | Steinke | |
| 5,813,244 | A * | 9/1998 | Palmer | F25B 41/38 138/44 |
| 5,836,349 | A * | 11/1998 | Kimberly | F25B 41/38 137/513 |
| 9,597,732 | B2 | 3/2017 | Lewis et al. | |
| 10,286,338 | B2 | 5/2019 | Levitt | |
| 10,758,981 | B2 | 9/2020 | Lewis et al. | |
| 2004/0211478 | A1 | 10/2004 | Mcculloch et al. | |
| 2008/0210017 | A1 | 9/2008 | Igarashi et al. | |
| 2022/0082345 | A1* | 3/2022 | Nagy-Zambo | F41A 21/34 |

FOREIGN PATENT DOCUMENTS

| | | | |
|---|---|---|---|
| CN | 105772297 | A | 7/2016 |
| CN | 105953076 | A | 9/2016 |
| DE | 2814932 | A1 | 10/1978 |
| DE | 202018101173 | U1 | 4/2018 |
| JP | 6762058 | B2 | 8/2015 |
| JP | 2019063449 | A | 4/2019 |
| WO | 02059522 | A1 | 8/2002 |

* cited by examiner

DUAL DIRECTION FLOW RESTRICTOR

TECHNICAL FIELD

The present disclosure generally relates to flow restrictors, and more particularly relates to dual direction flow restrictors.

BACKGROUND

Flow restrictors are utilized in hydraulic and pneumatic systems to provide predetermined localized resistances to unidirectional and bi-directional fluid flow. Generally, a flow restrictor includes a flow path that has a restricted orifice. In certain instances, the flow restrictor may include one or more perforated screens to prevent debris from clogging the restricted orifice. In the example of additively manufactured flow restrictors, the perforated screens may become clogged with debris during the additive manufacturing process. In certain instances, due to the structure of the additively manufactured flow restrictor, it may be difficult to access the debris generated during the additive manufacture of the flow restrictor to remove the debris, which may impact the performance of the additively manufactured flow restrictor.

Accordingly, it is desirable to provide a dual direction flow restrictor that prevents debris from clogging a restricted orifice, but also enables debris introduced during additive manufacturing of the flow restrictor to be easily removed to ensure performance. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a flow restrictor. The flow restrictor includes a first flowbody defining a first end portion, a second end portion opposite the first end portion and an orifice between the first end portion and the second end portion. The first end portion defines a plurality of first slots, and the second end portion defines a counterbore having a first diameter. The flow restrictor includes a second flowbody defining a plurality of second slots and having a second diameter proximate the plurality of second slots that is greater than the first diameter of the first flowbody. The second flowbody is configured to be received within the counterbore of the first flowbody.

The second flowbody includes a third end portion and a fourth end portion opposite the third end portion, and the plurality of second slots are defined through the third end portion. The second diameter is an external diameter of the fourth end portion. Each first slot of the plurality of first slots has the same orientation relative to a longitudinal axis of the flow restrictor. The plurality of first slots and the plurality of second slots each have the same orientation relative to a longitudinal axis of the flow restrictor. The plurality of first slots are spiral slots that wrap around a longitudinal axis of the flow restrictor at a first angle. The plurality of second slots are spiral slots that wrap around the longitudinal axis at a second angle, and the second angle is the same as the first angle. Each first slot of the plurality of first slots has a first start point and a first end point, and the first start point of each first slot of the plurality of first slots is the same. The first end point of each first slot of the plurality of first slots is different. The first start point of each first slot of the plurality of first slots is a tip of the first end portion of the first flowbody. The counterbore defines a first tapered surface, the second flowbody defines a second tapered surface configured to contact the first tapered surface to couple the second flowbody to the first flowbody in a coupled state. In the coupled state, the plurality of second slots are proximate the orifice. The plurality of first slots are defined through the first end portion so as to be spaced apart about a circumference of the first end portion.

Also provided is a flow restrictor. The flow restrictor includes a first flowbody defining a first end portion, a second end portion opposite the first end portion and an orifice between the first end portion and the second end portion. The first end portion defines a plurality of first slots, and the second end portion defining a counterbore having a first diameter in an uncoupled state. The flow restrictor includes a second flowbody configured to be coupled to the first flowbody. The second flowbody defines a plurality of second slots and has a second diameter proximate the plurality of second slots that is greater than the first diameter. The second flowbody is received within the counterbore of the first flowbody in a coupled state and is configured to expand the second end portion to a third diameter in the coupled state.

The second flowbody includes a third end portion and a fourth end portion opposite the third end portion, the plurality of second slots are defined through the third end portion and the second diameter is an external diameter of the fourth end portion. The plurality of first slots and the plurality of second slots each have the same orientation relative to a longitudinal axis of the flow restrictor. The plurality of first slots are spiral slots that wrap around a longitudinal axis of the flow restrictor at a first angle, the plurality of second slots are spiral slots that wrap around the longitudinal axis at a second angle, and the second angle is the same as the first angle. Each first slot of the plurality of first slots has a first start point and a first end point, the first start point of each first slot of the plurality of first slots is the same and the first end point of each first slot of the plurality of first slots is different. The first start point of each first slot of the plurality of first slots is a tip of the first end portion of the first flowbody. The counterbore defines a first tapered surface, the second flowbody defines a second tapered surface configured to contact the first tapered surface to couple the second flowbody to the first flowbody in the coupled state, and in the coupled state, the plurality of second slots are proximate the orifice.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
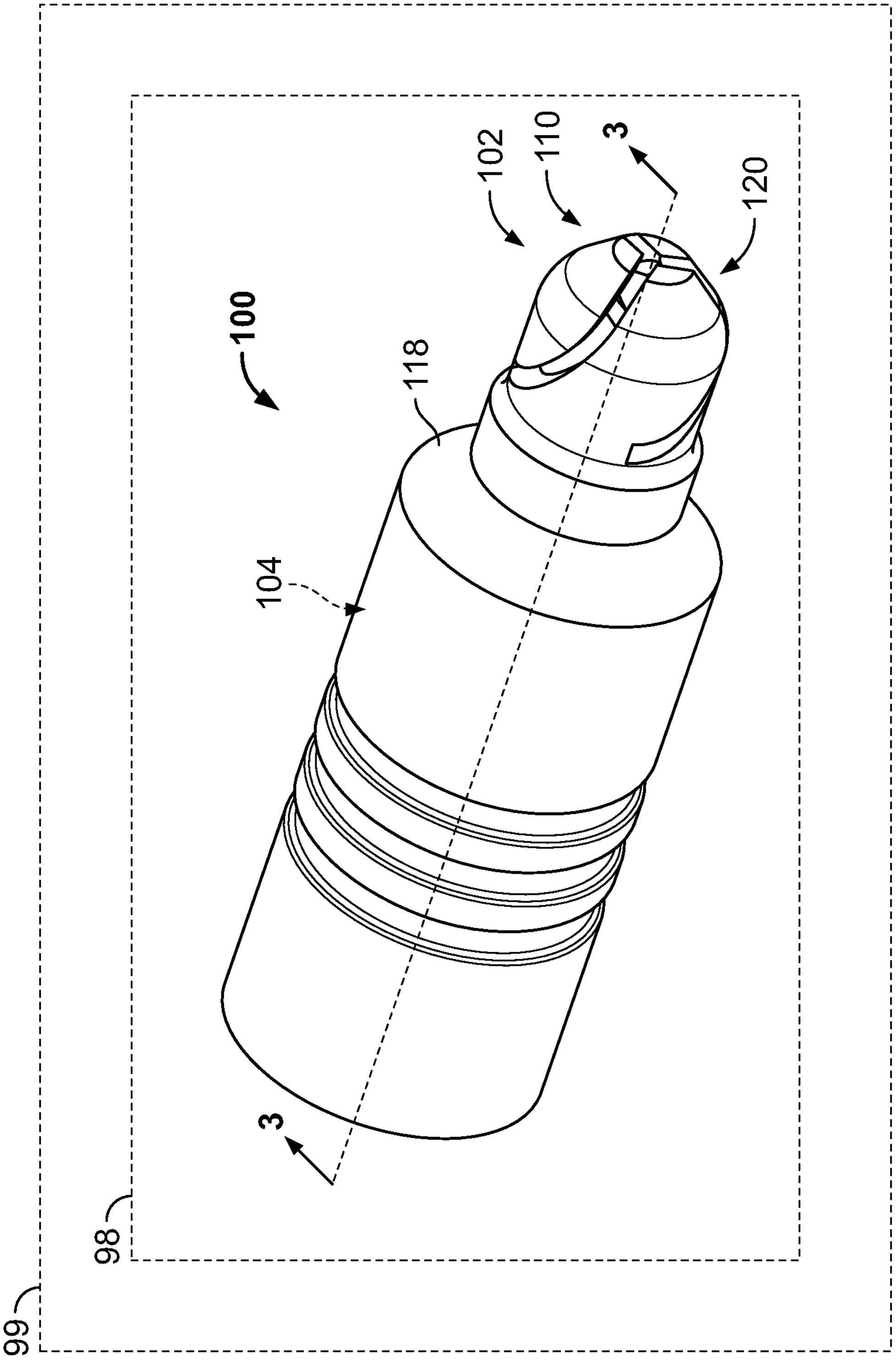
FIG. 1 is a schematic illustration of a dual direction flow restrictor for use with a gas turbine engine associated with a vehicle in accordance with the various teachings of the present disclosure, in which the flow restrictor is in a coupled state.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of flow restrictor, and the use of the flow restrictor with a gas turbine engine associated with a vehicle described herein is merely one exemplary embodiment according to the present disclosure. In addition, while the flow restrictor is described herein as being used with a gas turbine engine onboard a vehicle, such as a bus, motorcycle, train, automobile, marine vessel, aircraft, rotorcraft and the like, the various teachings of the present disclosure can be used with a gas turbine engine in other applications. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 10% to account for manufacturing tolerances. Also, as used herein, the term "about" denotes within 10% to account for manufacturing tolerances.

With reference to FIG. 1, a perspective view of a flow restrictor 100 is shown. In one example, the flow restrictor 100 is used to restrict a flow of fuel associated with a fuel system of a gas turbine engine 98 installed on a vehicle 99, such as an aircraft. It should be noted, however, that the flow restrictor 100 may be employed with various other hydraulic, pneumatic and fuel systems. In this example, with reference to FIG. 2, the flow restrictor 100 includes a first flowbody 102 and a second flowbody 104. The first flowbody 102 and the second flowbody 104 are each composed of a metal or metal alloy, and are formed via additive manufacturing, including, but not limited to, direct metal laser sintering (DMLS), laser powder bed fusion, etc. The first flowbody 102 is formed separately from the second flowbody 104, which enables debris associated with the additive manufacturing of the first flowbody 102 and/or second flowbody 104 to be cleaned, through washing or pneumatic spraying, for example, prior to assembling the first flowbody 102 to the second flowbody 104. The first flowbody 102 is shown uncoupled from the second flowbody 104 in FIG. 2, and the flow restrictor 100 is in an uncoupled state 10. In FIG. 3, the first flowbody 102 is coupled to the second flowbody 104 and the flow restrictor 100 is in a coupled state 12. In the coupled state 12, the first flowbody 102 is coupled to the second flowbody 104 in a fluid tight manner. Generally, the flow restrictor 100 is a dual direction or bidirectional flow restrictor 100, such that fluid may flow through the flow restrictor 100 in a first direction D1 (FIG. 3) from the second flowbody 104 to the first flowbody 102; or in a second direction D2 from the first flowbody 102 to the second flowbody 104.

Figure 2:
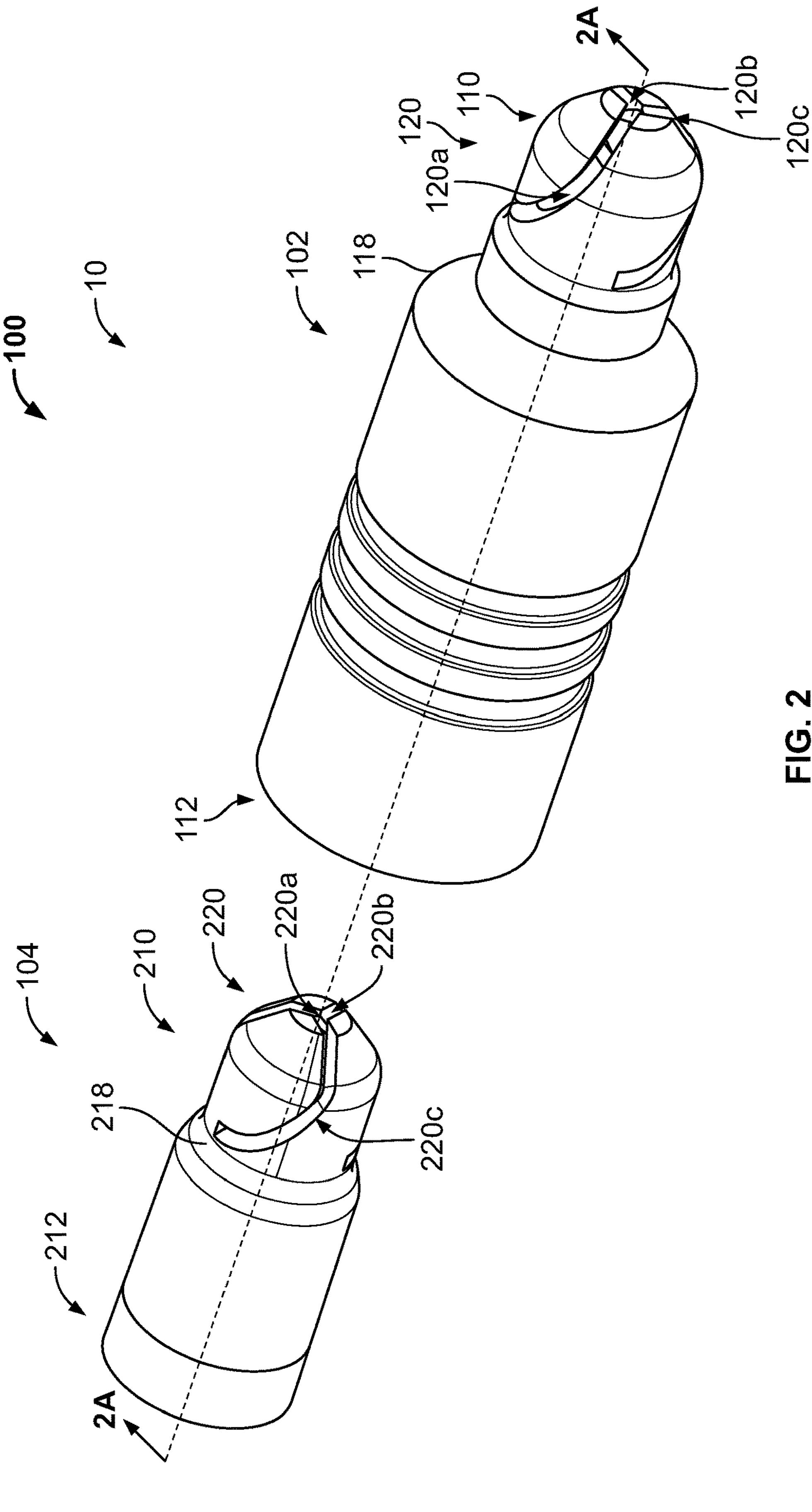
FIG. 2 is a perspective view of the flow restrictor, in which the flow restrictor is in an uncoupled state such that a first flowbody is separate from a second flowbody.
Figure 3:
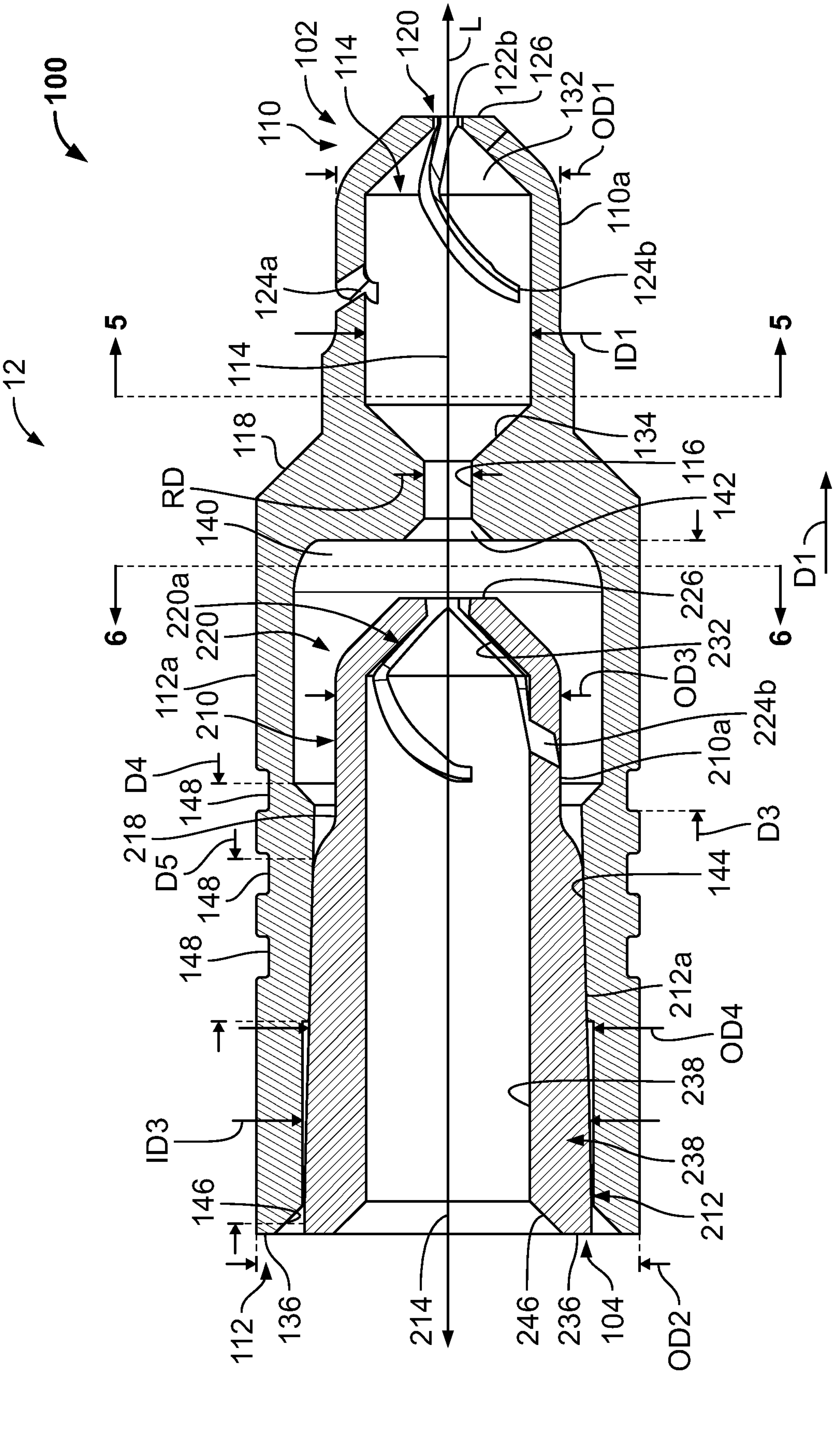
FIG. 3 is a cross-sectional view of the flow restrictor of FIG. 1, taken along line 3-3 of FIG. 1.

With continued reference to FIG. 2 and additional reference to FIG. 3, the first flowbody 102 includes a first end portion 110, a second end portion 112 opposite the first end portion 110 and defines a flowpath generally indicated by reference numeral 114 between the first end portion 110 and the second end portion 112 along a longitudinal axis L of the flow restrictor 100. A restricted orifice or orifice 116 is defined in the first flowbody 102 between the first end portion 110 and the second end portion 112. The first flowbody 102 is substantially circular in cross-section, and the first end portion 110 has a first outer diameter OD1 that is different and less than a second outer diameter OD2 of the second end portion 112 (FIG. 3). In one example, the first outer diameter OD1 is about 0.025 millimeters (mm) to about 0.500 millimeters (mm), and the second outer diameter OD2 is about 0.025 millimeters (mm) to about 0.500 millimeters (mm). Stated another way, the second end portion 112 of the first flowbody 102 is cylindrical, and transitions proximate or near the first end portion 110 along a tapered portion 118 to the first end portion 110.

Figure 4:
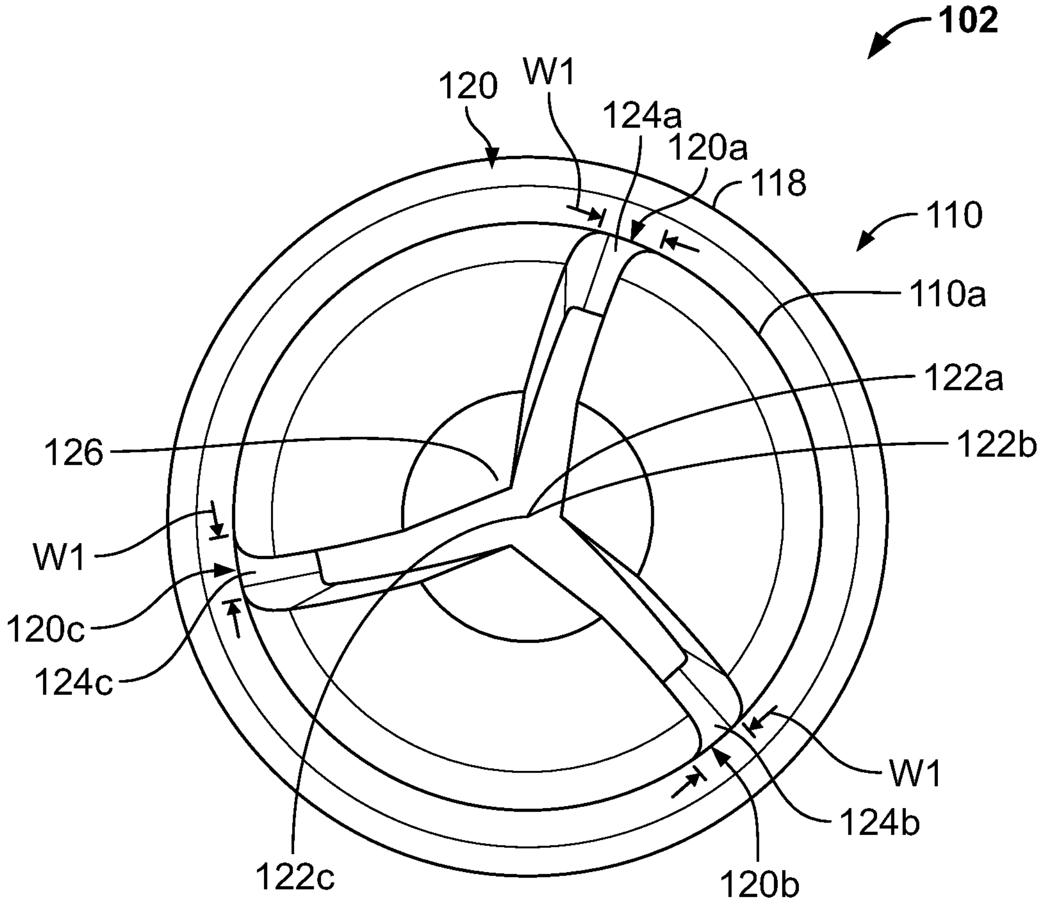
FIG. 4 is an end view of the first flowbody of the flow restrictor.

The first end portion 110 has the reduced first outer diameter OD1 for coupling the first flowbody 102 to a female connector or other connector associated with the fuel system of the gas turbine engine 98, for example, and for forming a fluid tight coupling between the first end portion 110 and the associated connector. The first end portion 110 defines a plurality of first slots 120. The first slots 120 extend from the first end portion 110 toward the second end portion 112. In one example, the first slots 120 include three first slots 120*a*-120*c*, however, the first slots 120 may include any number of first slots 120. With reference to FIG. 4, in this example, each of the first slots 120*a*-120*c* is spiral in shape, and has a first start point 122*a*-122*c* and an opposite first end point 124*a*-124*c*. In this example, the first start point 122*a*-122*c* of each of the first slots 120*a*-120*c* is in communication with each other such that the first slots 120*a*-120*c* are initiated or start from a common point. The first start point 122*a*-122*c* of each of the respective first slots 120*a*-120*c* is defined at an apex or tip 126 of the first end portion 110. The first end point 124*a*-124*c* of each of the first slots 120*a*-120*c* is discrete, separate, or not in communication with another one of the first end points 124*a*-124*c*.

Figure 5:
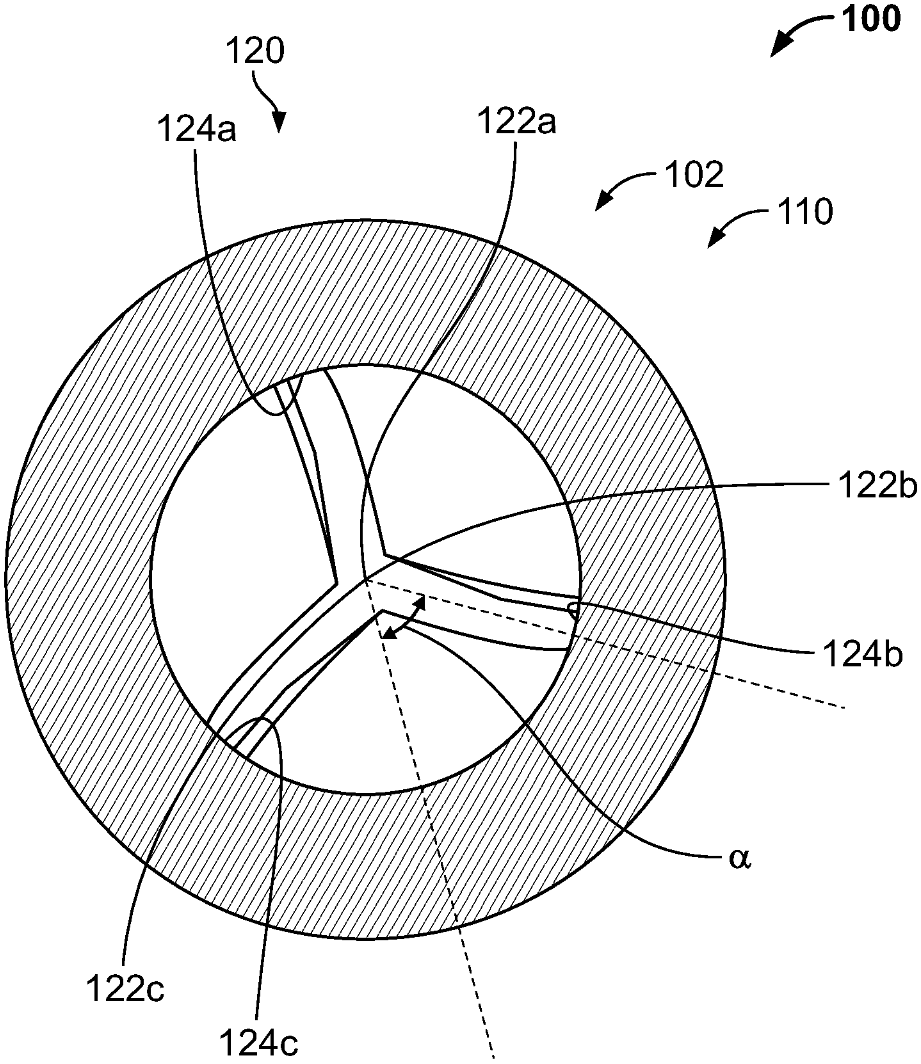
FIG. 5 is a cross-sectional view of the flow restrictor, taken along line 5-5 of FIG. 3.

Each of the first slots 120*a*-120*c* extend from the respective first start point 122*a*-122*c* along a curved, arcuate, or spiral path to the respective first end point 124*a*-124*c*, which is spaced a distance from the respective first start point 122*a*-122*c* along the longitudinal axis L. Generally, each of the first slots 120*a*-120*c* extend for a predetermined minimum length along the longitudinal axis L from the first start point 122*a*-122*c* to the first end point 124*a*-124*c*. The length of the first slots 120*a*-120*c* cooperates with a first slot width W1 (FIG. 4) of the first slots 120*a*-120*c* to define a respective predetermined area for each of the first slots 120*a*-120*c*. A total area of the first slots 120*a*-120*c* (sum of the predetermined area of each of the first slots 120*a*-120*c*) is different and greater than an area of the orifice 116 such that the orifice 116 controls a pressure drop through the flow restrictor 100. While the first slots 120*a*-120*c* share a common first start point 122*a*-122*c*, the spiral path of each of the first slots 120*a*-120*c* does not intersect each other. In one example, the spiral path defined by each of the first slots 120*a*-120*c* extends for no more than 90 degrees respectively about a perimeter or circumference 110*a* of the first end portion 110. For example, with reference to FIG. 5, a first angle α defined between the respective first start point 122*a*-122*c* and the respective first end point 124*a*-124*c* is less than about 120 degrees, and in this example, is about 60 degrees. Stated another way, the spiral path of each of the first slots 120*a*-120*c* wraps less than about 120 degrees around the longitudinal axis L, and in this example, the spiral path of each of the first slots 120*a*-120*c* wraps about 60 degrees around the longitudinal axis L. The first slots 120*a*-120*c* are substantially evenly spaced about the circumference 110*a* of the first end portion 110, and thus, each of the first slots 120*a*-120*c* may be about 120 degrees apart from each other. It should be noted that the first slots 120*a*-120*c* may be spaced differently depending on the application.

With reference back to FIG. 4, each of the first slots 120*a*-120*c* of the first end portion 110 are orientated in the same direction. In this example, each of the first slots 120*a*-120*c* is orientated to curve in a clockwise direction relative to the longitudinal axis L about the circumference 110*a* of the first end portion 110, however, the first slots 120*a*-120*c* may be orientated to curve in a counterclockwise direction relative to the longitudinal axis L. Generally, the first slots 120*a*-120*c* have the first slot width W1, which is the same for each of the first slots 120*a*-120*c*. The first slot width W1 is predetermined based on the debris desired to be captured by the first slots 120*a*-120*c*, and thus, the first slot width W1 may be predetermined based on the application of the flow restrictor 100. In one example, the first slot width W1 is about 0.001 millimeters (mm) to about 0.500 millimeters (mm). Generally, each of the first slots 120*a*-120*c* cooperate to define a first screen, which is self-cleaning when coupled to the second flowbody 104. As will be discussed, by providing the first flowbody 102 with the first slots 120*a*-120*c* that extend along the spiral path, the first slots 120*a*-120*c* assist in inducing a swirl into the flow, which results in self-cleaning of a second screen defined by a plurality of second slots 220 of the second flowbody 104 (FIG. 2).

With reference back to FIG. 3, the flowpath 114 defined by the first end portion 110 extends from the tip 126 to the orifice 116 at the tapered portion 118. At the tip 126, the flowpath 114 expands along a first internal ramped surface 132 when the fluid flows in the second direction D2. The respective first start points 122*a*-122*c* for the first slots 120*a*-120*c* extend through the tip 126 and the first internal ramped surface 132. The first internal ramped surface 132 directs or guides the flow through the first slots 120*a*-120*c* when the flow through the flow restrictor 100 is along the longitudinal axis L in the first direction D1, from the second end portion 112 to the first end portion 110. The first internal ramped surface 132 extends at an angle of about 45 degrees relative to the circumference 110*a* of the first end portion 110 to terminate at the tip 126.

The first end portion 110 also defines a second internal ramped surface 134. The second internal ramped surface 134 is a countersink surface in communication with the orifice 116. The second internal ramped surface 134 is opposite the first internal ramped surface 132, and directs or guides flow into the orifice 116 when the direction of flow along the longitudinal axis L is in the second direction D2 opposite the first direction D1. The second internal ramped surface 134 extends at an angle of about 135 degrees relative to the circumference 110*a* of the first end portion 110. The first internal ramped surface 132 cooperates with the first slots 120*a*-120*c* to induce swirl into the flow, which enables the flow to self-clean the downstream second slots 220*a*-220*c*.

The tapered portion 118 transitions the first end portion 110 to the second end portion 112. In this example, the tapered portion 118 is defined about the orifice 116. The orifice 116 is defined between the first end portion 110 and the second end portion 112 substantially within the tapered portion 118. The orifice 116 is defined with an orifice diameter RD, which is different and less than a first internal diameter ID1 of the first end portion 110 proximate the second internal ramped surface 134. In one example, the first internal diameter ID1 is about 0.025 millimeters (mm) to about 0.375 millimeters (mm), and the orifice diameter RD is about 0.001 millimeters (mm) to about 0.075 millimeters (mm). The orifice diameter RD is also different and less than a third internal diameter ID3 of the second end portion 112 when the flow restrictor 100 is in the coupled state 12. In one example, the third internal diameter ID3 is about 0.035 millimeters (mm) to about 0.510 millimeters (mm). Generally, the orifice diameter RD is a minimum inner diameter of a flowpath defined through the flow restrictor 100. The orifice 116 has a circular cross-section, and extends along the flowpath defined by the flow restrictor 100. The orifice 116 fluidly couples the first end portion 110 to the second end portion 112 along the flowpath of the flow restrictor 100. Generally, an opening defined at the tip 126 by the first start points 122*a*-122*c* of the first slots 120*a*-120*c* has a diameter, which is different and smaller than the orifice diameter RD. This prevents or inhibits debris that may clog the orifice 116 from passing through the first slots 120*a*-120*c*. Generally, the flowpath of the flow restrictor 100 is defined by flowpaths 114, 214 of the respective first flowbody 102 and second flowbody 104 along the longitudinal axis L of the flow restrictor 100.

The second end portion 112 is substantially cylindrical. The second end portion 112 extends from the tapered portion 118 to a distal end 136 of the first flowbody 102. The second end portion 112 defines a counterbore 138 that extends along the flowpath 114 to an internal wall 140. The internal wall 140 is proximate or adjacent to the tapered portion 118. The internal wall 140 includes a countersink surface 142 that extends from the internal wall 140 to the orifice 116. The countersink surface 142 surrounds the orifice 116 and directs or guides fluid into the orifice 116 when the fluid flows in the first direction D1. The countersink surface 142 and the second internal ramped surface 134 on opposed ends of the orifice 116 assists in providing uniform performance through the flow restrictor 100.

The counterbore 138 includes a first tapered surface 144. The first tapered surface 144 is spaced is spaced apart from the internal wall 140 by a distance D3. The distance D3 is predetermined to enable the second flowbody 104 to be received within the first flowbody 102 in the coupled state 12. In one example, the distance D3 is about 1.5 times the orifice diameter RD. The first tapered surface 144 extends radially inward and axially along a portion of the counterbore 138 between the internal wall 140 and the distal end 136. In one example, the first tapered surface 144 extends for a distance D4, which is different and less than the distance D3. The first tapered surface 144 is inclined in the first direction D1, or in the direction from the distal end 136 to the tip 126. The first tapered surface 144 cooperates with the second flowbody 104 to fixedly couple the second flowbody 104 to the first flowbody 102. The counterbore 138 may also include a countersink surface 146 about the distal end 136 to facilitate the insertion of the second flowbody 104 into the first flowbody 102.

Figure 2A:
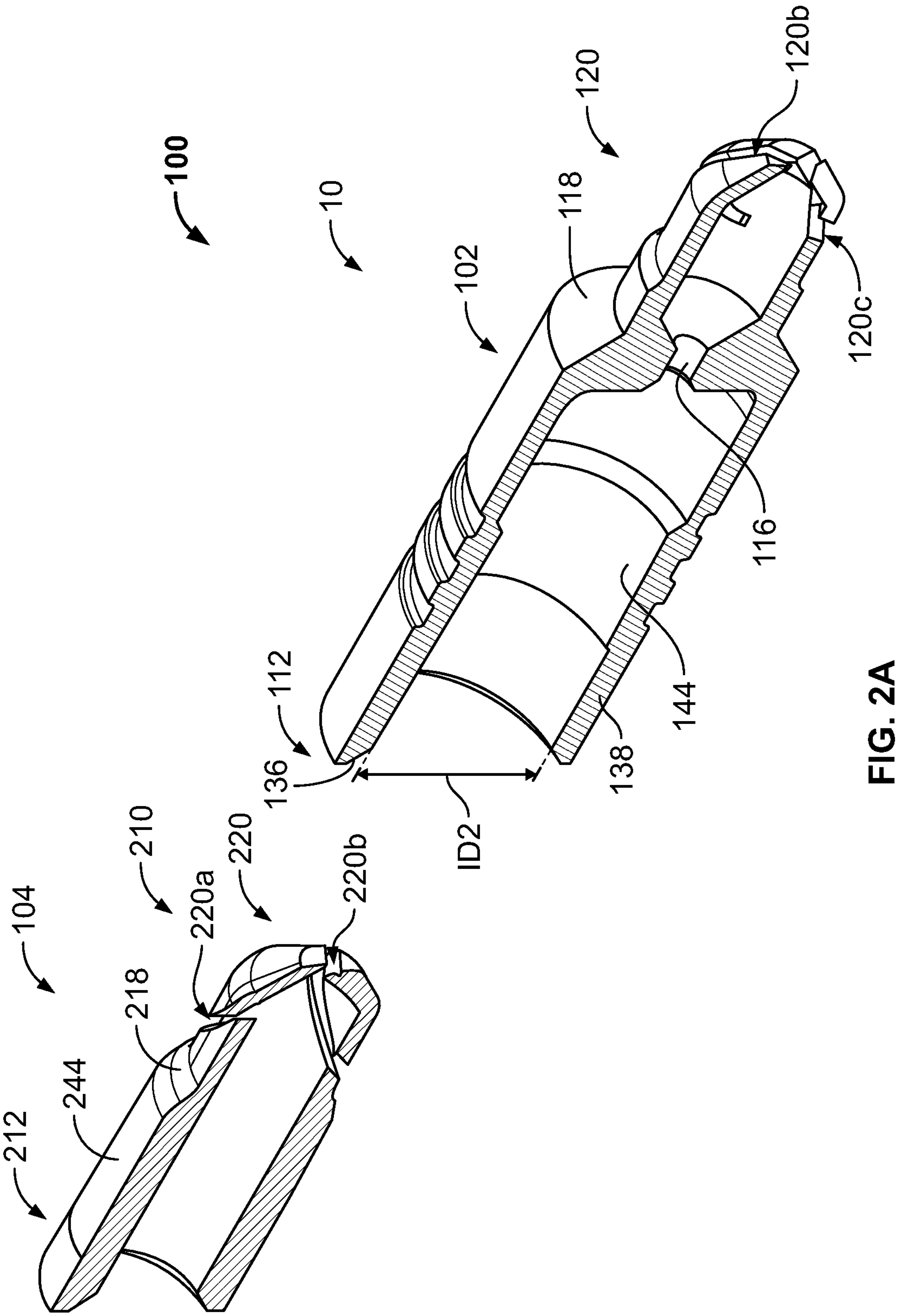
FIG. 2A is a cross-sectional view of the flow restrictor of FIG. 2, taken along line 2A-2A of FIG. 2.

Generally, with reference to FIG. 2A, in the uncoupled state 10, the counterbore 138 of the second end portion 112 has a second internal diameter ID2 between the distal end 136 and the first tapered surface 144 that is different and less than the third internal diameter ID3 between the distal end 136 and the first tapered surface 144 when the flow restrictor 100 is in the coupled state 12. Stated another way, the counterbore 138 has the second internal diameter ID2 proximate the orifice 116 in the uncoupled state, and the second end portion 112 has the third internal diameter ID3 in the coupled state (FIG. 3). In one example, the second internal diameter ID2 is about 0.025 millimeters (mm) to about 0.500 millimeters (mm). When the second flowbody 104 is coupled to the first flowbody 102, with reference to FIG. 3, the second flowbody 104 expands the second end portion 112 of the first flowbody 102 to form the fluid-tight fit between the first flowbody 102 and the second flowbody 104. In other words, the second flowbody 104 physically deforms the second end portion 112 of the first flowbody 102 during installation to create the fluid-tight fit between the first flowbody 102 and the second flowbody 104.

The second end portion 112 of the first flowbody 102 may also include one or more external coupling features, such as one or more grooves 148, defined about a perimeter or circumference 112*a* of the second end portion 112. In this example, the second end portion 112 includes three grooves 148, which may receive seals, connectors, etc. associated with the fuel system of the gas turbine engine 98 (FIG. 1).

With reference to FIGS. 2 and 3, the second flowbody 104 includes a third end portion 210, a fourth end portion 212 opposite the third end portion 210 and defines a flowpath generally indicated by reference numeral 214 between the third end portion 210 and the fourth end portion 212 along the longitudinal axis L of the flow restrictor 100. The second flowbody 104 is substantially circular in cross-section, and the third end portion 210 has a third outer diameter OD3 that is different and less than a fourth outer diameter OD4 of the fourth end portion 212 (FIG. 3). In one example, the third outer diameter OD3 is about 0.025 millimeters (mm) to about 0.500 millimeters (mm), and the fourth outer diameter OD4 is about 0.025 millimeters (mm) to about 0.500 millimeters (mm). Stated another way, the fourth end portion 212 of the second flowbody 104 is cylindrical, and transitions proximate or near the fourth end portion 212 along a tapered portion 218 to the third end portion 210. The fourth outer diameter OD4 is different and greater than the second internal diameter ID2 of the second end portion 112 (FIG. 2A) of the first flowbody 102 such that the coupling of the second flowbody 104 to the first flowbody 102 results in a physical deformation of the second end portion 112 of the first flowbody 102 and expands the second end portion 112 to the third internal diameter ID3 in the coupled state 12.

Figure 6:
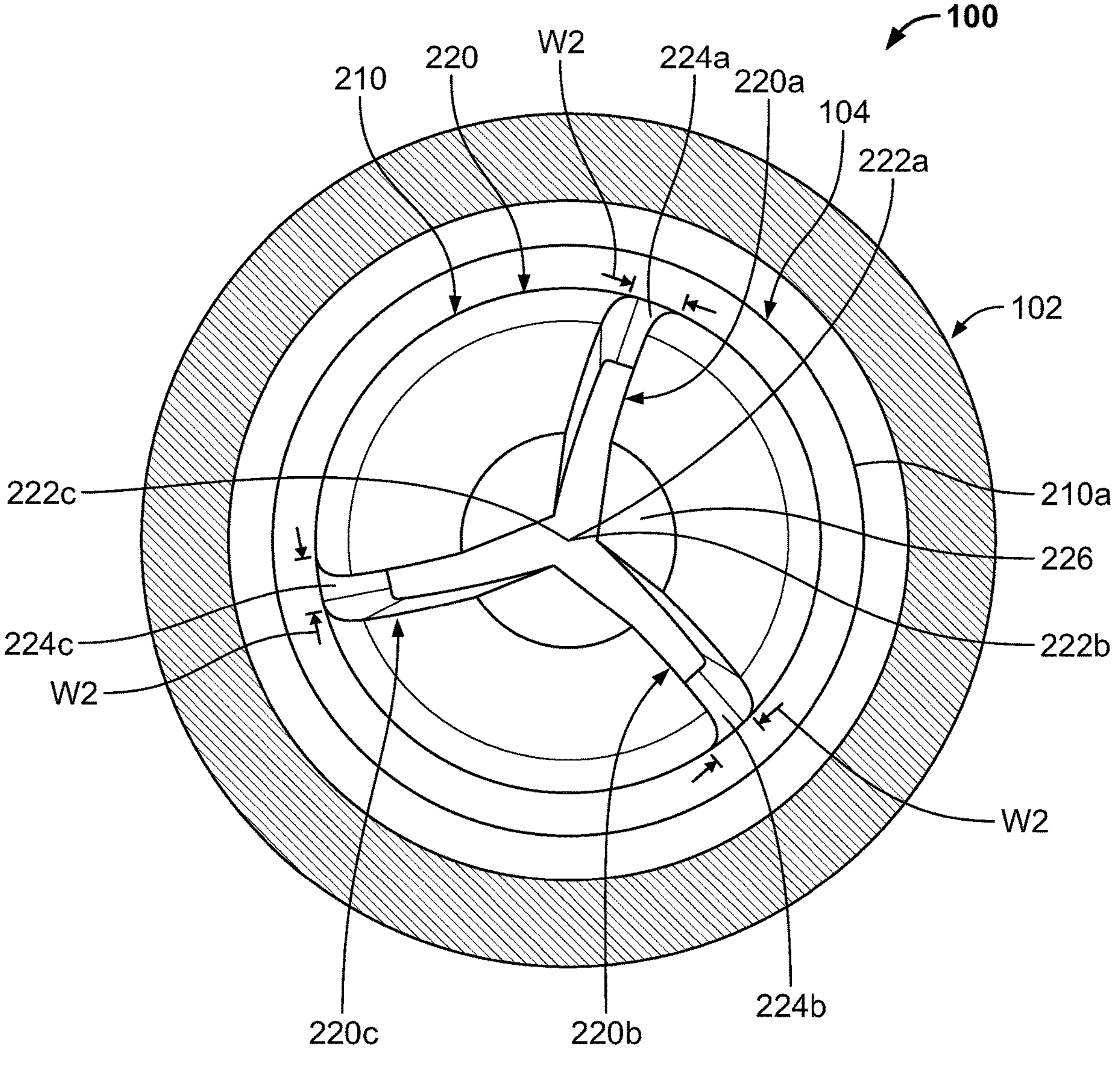
FIG. 6 is a cross-sectional view of the flow restrictor, taken along line 6-6 of FIG. 3.

The third end portion 210 has the reduced third outer diameter OD3 for coupling the second flowbody 104 to the first flowbody 102. Generally, the third end portion 210 has a geometry similar to or substantially symmetric to the first end portion 110 of the first flowbody 102 to minimize losses as the flow passes through the flow restrictor 100 in either direction D1, D2. The third end portion 210 defines the plurality of second slots 220. The second slots 220 extend from the third end portion 210 toward the fourth end portion 212. In one example, the second slots 220 include three second slots 220*a*-220*c*, however, the second slots 220 may include any number of second slots 220. With reference to FIG. 6, in this example, each of the second slots 220*a*-220*c* is spiral in shape, and has a second start point 222*a*-222*c* and an opposite second end point 224*a*-224*c*. In this example, the second start point 222*a*-222*c* of each of the second slots 220*a*-220*c* is in communication with each other such that the second slots 220*a*-220*c* are initiated or start from a common point. The second start point 222*a*-222*c* of each of the respective second slots 220*a*-220*c* is defined at a second apex or second tip 226 of the third end portion 210. The second end point 224*a*-224*c* of each of the second slots 220*a*-220*c* is discrete, separate, or not in communication with another one of the second end points 224*a*-224*c*.

Figure 7:
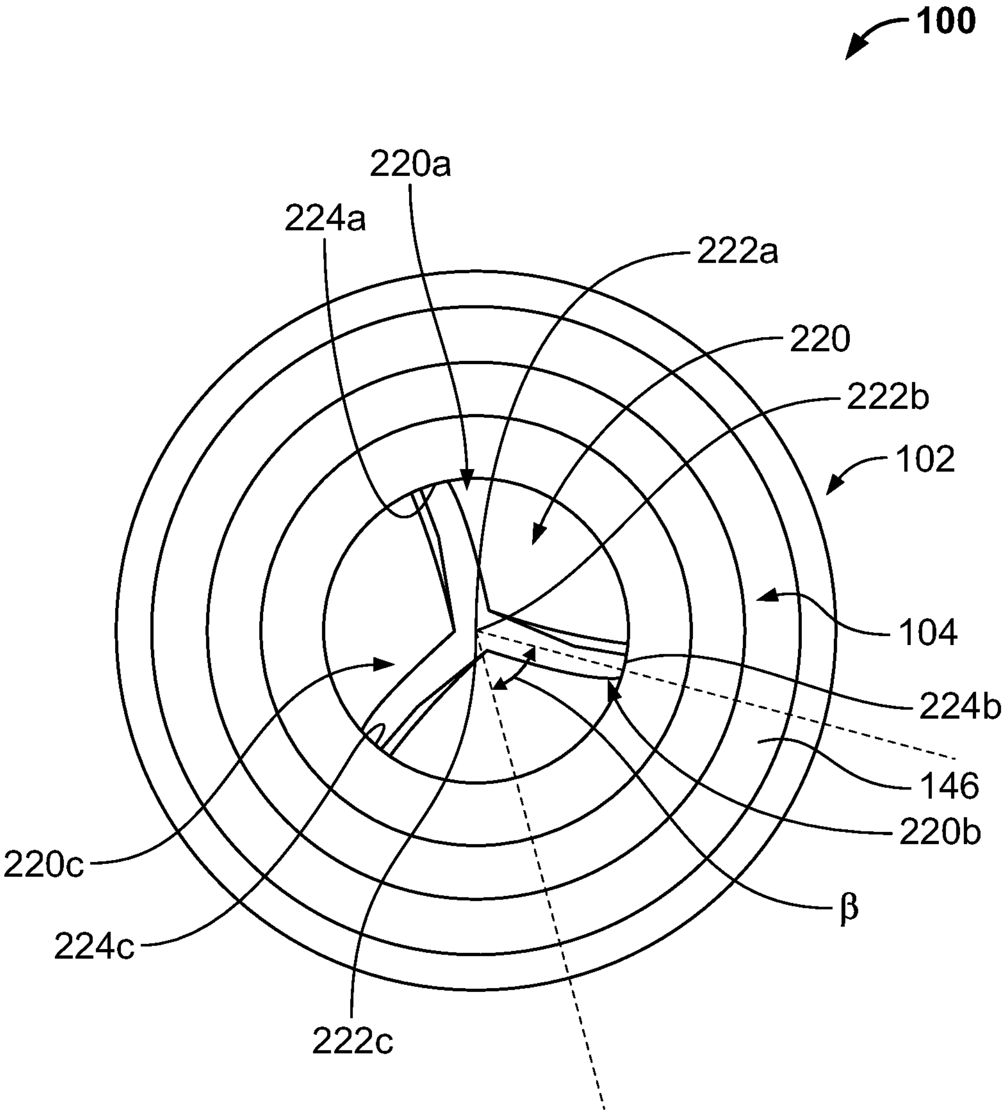
FIG. 7 is an end view of the flow restrictor in the coupled state.

Each of the second slots 220*a*-220*c* extend from the respective second start point 222*a*-222*c* along a curved, arcuate, or spiral path to the respective second end point 224*a*-224*c*, which is spaced a distance from the respective second start point 222*a*-222*c* along the longitudinal axis L. Generally, each of the second slots 220*a*-220*c* extend for a predetermined minimum length along the longitudinal axis L from the second start point 222*a*-222*c* to the second end point 224*a*-224*c*. The length of the second slots 220*a*-220*c* cooperates with a second slot width W2 (FIG. 6) of the second slots 220*a*-220*c* to define a respective predetermined area for each of the second slots 220*a*-220*c*. A total area of the second slots 220*a*-220*c* (sum of the predetermined area of each of the second slots 220*a*-220*c*) is different and greater than the area of the orifice 116 such that the orifice 116 controls the pressure drop through the flow restrictor 100. While the second slots 220*a*-220*c* share a common second start point 222*a*-222*c*, the spiral path of each of the second slots 220*a*-220*c* does not intersect each other. In one example, the spiral path defined by each of the second slots 220*a*-220*c* extends for no more than 90 degrees respectively about a perimeter or circumference 210*a* of the third end portion 210. For example, with reference to FIG. 7, a second angle (3 defined between the respective second start point 222*a*-222*c* and the respective second end point 224*a*-224*c* is less than about 120 degrees, and in this example, is about 60 degrees. Stated another way, the spiral path of each of the second slots 220*a*-220*c* wraps less than about 120 degrees around the longitudinal axis L, and in this example, the spiral path of each of the second slots 220a-220c wraps about 60 degrees around the longitudinal axis L. The second slots 220a-220c are substantially evenly spaced about the circumference 210a of the first end portion 110 (FIG. 6), and thus, each of the second slots 220a-220c may be about 120 degrees apart from each other. It should be noted that the second slots 220a-220c may be spaced differently depending on the application. In addition, while the first angle α is described and illustrated herein as being about equal to or substantially the same as the second angle (3, in other examples, the first angle α and the second angle β may be different. Generally, the first angle α and the second angle β are predetermined based on a required open area to minimize pressure losses while maintaining a strength of the flow restrictor 100.

With reference back to FIG. 6, each of the second slots 220a-220c of the third end portion 210 are orientated in the same direction. In this example, each of the second slots 220a-220c is orientated to curve in a clockwise direction relative to the longitudinal axis L about the circumference 210a of the third end portion 210, however, the second slots 220a-220c may be orientated to curve in a counterclockwise direction relative to the longitudinal axis L. The first slots 120a-120c in this example are orientated at the same orientation as the second slots 220a-220c. It should be noted that in other examples, the second slots 220a-220c may have a different orientation than the first slots 120a-120c. In addition, while the second slots 220a-220c are illustrated as being circumferentially offset from the first slots 120a-120c by about 30 degrees about the longitudinal axis L, the second slots 220a-220c may be circumferentially orientated at any orientation relative to the first slots 120a-120c based on the orientation of the second flowbody 104 during coupling of the second flowbody 104 to the first flowbody 102. Generally, the second slots 220a-220c have the second slot width W2, which is the same for each of the second slots 220a-220c. The second slot width W2 is predetermined based on the debris desired to be captured by the second slots 220a-220c, and thus, the second slot width W2 may be predetermined based on the application of the flow restrictor 100. In one example, the second slot width W2 is about 0.001 millimeters (mm) to about 0.075 millimeters (mm). The first slot width W1 is about the same as the second slot width W2 to minimize flow losses, however, the first slot width W1 and the second slot width W2 may be different. Generally, the first slot with W1 and the second slot width W2 are narrower than a minimum size of contamination the flow restrictor 100 is rated for to provide a filtering function for the flow restrictor 100. As discussed, each of the second slots 220a-220c cooperate to define the second screen, which is self-cleaning when coupled to the first flowbody 102. By providing the second flowbody 104 with the second slots 220a-220c that extend along the spiral path, the second slots 220a-220c assist in inducing swirl into the flow of fluid, which results in self-cleaning of the first screen defined by the first slots 120a-120c of the first flowbody 102 (FIG. 2). Generally, an opening defined at the second tip 226 by the second start points 222a-222c of the second slots 220a-220c has a second diameter, which is different and smaller than the orifice diameter RD. This prevents or inhibits debris that may clog the orifice 116 from passing through the second slots 220a-220c.

With reference back to FIG. 3, the flowpath 214 defined by the third end portion 210 extends from the second tip 226 to the tapered portion 218. At the second tip 226, the flowpath 214 expands along a third internal ramped surface 232 when the fluid flows in the second direction D2. The respective second start point 222a-222c for the second slots 220a-220c extends through the second tip 226 and the third internal ramped surface 232. The third internal ramped surface 232 directs or guides the flow through the second slots 220a-220c when the flow through the flow restrictor 100 is along the longitudinal axis L in the first direction D1. The third internal ramped surface 232 extends at an angle of about 45 degrees relative to the circumference 210a of the third end portion 210 to terminate at the second tip 226. The third internal ramped surface 232 cooperates with the second slots 220a-220c to induce swirl into the flow, which enables the flow to self-clean the downstream first slots 120a-120c.

The tapered portion 218 transitions the third end portion 210 to the fourth end portion 212. The fourth end portion 212 is substantially cylindrical. The fourth end portion 212 extends from the tapered portion 218 to a distal end 236 of the second flowbody 104. The fourth end portion 212 defines bore 238 that extends along the flowpath 214 to the second tip 226. The bore 238 may also include a countersink surface 246 about the distal end 236. The fourth end portion 212 also includes a second tapered surface 244 defined about an outer perimeter or external circumference 212a of the fourth end portion 212. The second tapered surface 244 is defined adjacent to or proximate the tapered portion 218. The second tapered surface 244 extends radially outward and axially along the circumference 212a. In one example, the second tapered surface 244 extends for a distance D5, which is different and less than the distance D4. The second tapered surface 244 is inclined in the second direction D2, or in the direction from the second tip 226 to the distal end 236. Thus, the second tapered surface 244 is tapered in a direction opposite the first tapered surface 144 of the first flowbody 102. The different tapers 144, 244 cooperate to fixedly couple the second flowbody 104 to the first flowbody 102.

In one example, the first flowbody 102 and the second flowbody 104 are each additively manufactured, via DMLS, laser powder bed fusion, for example. Each of the first flowbody 102 and the second flowbody 104 are printed in a direction that corresponds to the first direction D1 of FIG. 3. Any debris, such as unsintered or loose material, etc. created during the manufacture of the first flowbody 102 and/or the second flowbody 104 may be easily cleaned from the respective first flowbody 102 and/or the second flowbody 104 via washing or pneumatic spraying, for example. This ensures that the first slots 120a-120c and the second slots 220a-220c, along with the orifice 116, are clear of debris prior to assembly of the second flowbody 104 to the first flowbody 102. In addition, by providing the second flowbody 104 separate and discrete from the first flowbody 102, the orifice 116 may be visually inspected prior to assembly and the orifice diameter RD may be measured for accuracy.

In order to assemble the second flowbody 104 to the first flowbody 102, in one example, with the flow restrictor 100 in the uncoupled state 10, the first end portion 110 of the first flowbody 102 may be coupled to a female connector, for example, of the fuel system. The third end portion 210 of the second flowbody 104 is inserted into the counterbore 138 of the second end portion 112 of the first flowbody 102. The second flowbody 104 is advanced in the direction D1 until the tapers 144, 244 engage. The continued advancement of the second flowbody 104 into the counterbore 138 causes the second end portion 112 to expand to the third internal diameter ID3 due to the differences in the fourth outer diameter OD4 and the second internal diameter ID2 (FIG. 2A) to place the flow restrictor 100 in the coupled state 12 and the second end portion 112 at the third internal diameter ID3. The deformation in the first flowbody 102 caused by the second flowbody 104 creates a fluid-tight seal between the first flowbody 102 and the second flowbody 104. With the flow restrictor 100 in the coupled state 12, a connector may be coupled to the second end portion 112 of the first flowbody 102 and the flow restrictor 100 may be fluidly coupled in a fluid-tight manner to the fuel system associated with the gas turbine engine 98, for example.

During operation, as the fluid flows in the first direction D1, the second slots 220*a*-220*c* and the third internal ramped surface 232 cooperate to induce swirl into the flow that washes the exterior of the first slots 120*a*-120*c*, which results in a self-cleaning of the first slots 120*a*-120*c* of debris when the flow changes and flows in the second direction D2. Similarly, when the fluid flows in the second direction D2, the first slots 120*a*-120*c* and the first internal ramped surface 132 cooperate to induce swirl into the flow that washes the exterior of the second slots 220*a*-220*c*, which results in a self-cleaning of the second slots 220*a*-220*c* of debris when the flow changes and flows in the first direction D1. The self-cleaning aspect of the flow restrictor 100 inhibits blockage of the orifice 116, the first screen defined by the first slots 120*a*-120*c* and the second screen defined by the second slots 220*a*-220*c* by debris through the cleaning of the first slots 120*a*-120*c* and the second slots 220*a*-220*c* during use, which improves a life of the flow restrictor 100. The first slots 120*a*-120*c* and the second slots 220*a*-220*c* inhibit clogging of the orifice 116 in both directions D1, D2 of flow. In addition, the first slots 120*a*-120*c* and the second slots 220*a*-220*c* provide the same or symmetric performance when the fluid flows in the first direction D1 or the second direction D2. Stated another way, the flow restrictor 100 has a loss coefficient that is about the same in either direction, which improves overall performance of fluid channeling in fuel controls. It should be noted that the use of the first slots 120*a*-120*c* and the second slots 220*a*-220*c* also provides a larger area for the flow of the fluid when compared to a perforated screen.

Figure 8:
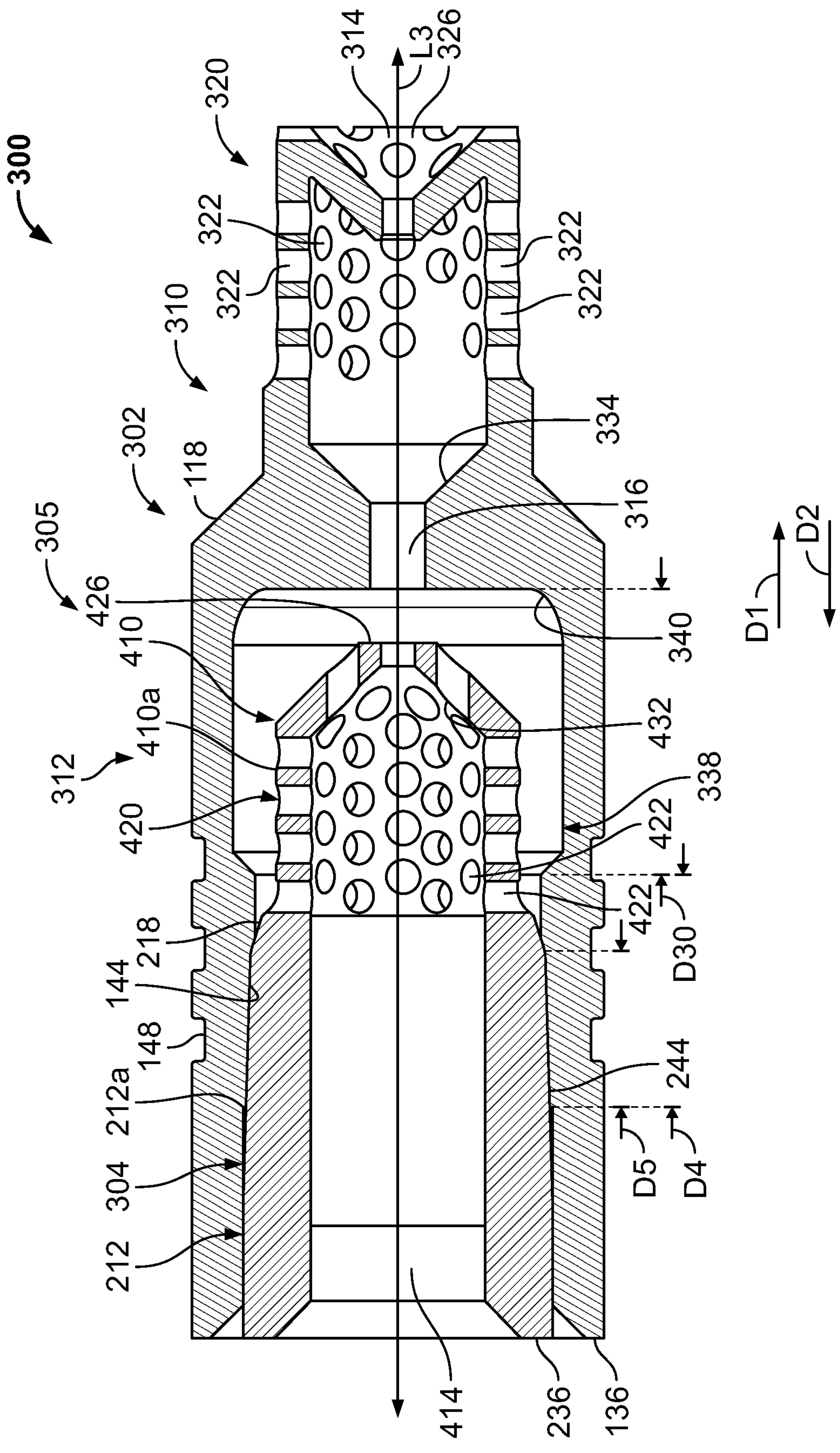
FIG. 8 is a cross-sectional view of another exemplary dual direction flow restrictor for use with a gas turbine engine associated with a vehicle in accordance with the various teachings of the present disclosure, in which the flow restrictor is in a coupled state.

It should be noted that in other embodiments, the flow restrictor 100 may be configured differently to enable dual directional or bidirectional flow. For example, with reference to FIG. 8, a flow restrictor 300 is shown. As the flow restrictor 300 includes components that are the same or similar to components of the flow restrictor 100 discussed with regard to FIGS. 1-7, the same reference numerals will be used to denote the same or similar components. The flow restrictor 300 includes a first flowbody 302 and a second flowbody 304. The flow restrictor 300 is substantially axi-symmetric about a longitudinal axis L3 that extends through the flow restrictor 300. The first flowbody 302 and the second flowbody 304 are each composed of a metal or metal alloy, and are formed via additive manufacturing, including, but not limited to, direct metal laser sintering (DMLS), laser powder bed fusion, etc. The first flowbody 302 is formed separately from the second flowbody 304, which enables debris associated with the manufacturing of the first flowbody 302 and/or second flowbody 304 to be cleaned, through washing or pneumatic spraying, for example, prior to assembling the first flowbody 302 to the second flowbody 304. The first flowbody 302 is shown coupled to the second flowbody 304 in a coupled state 305 in FIG. 8. In the coupled state, the first flowbody 302 is coupled to the second flowbody 304 in a fluid tight manner. The first flowbody 302 is uncoupled from the second flowbody 304 in an uncoupled state. Generally, the flow restrictor 300 enables fluid to flow through the flow restrictor 300 in the first direction D1 from the second flowbody 304 to the first flowbody 302; or in the second direction D2 from the first flowbody 302 to the second flowbody 304.

The first flowbody 302 includes a first end portion 310, a second end portion 312 opposite the first end portion 310 and defines a flowpath generally indicated by reference numeral 314 between the first end portion 310 and the second end portion 312 along a longitudinal axis L3 of the flow restrictor 300. A restricted orifice or orifice 316 is defined in the first flowbody 302 between the first end portion 310 and the second end portion 312. The first flowbody 302 is substantially circular in cross-section, and the first end portion 310 has a first outer diameter that is different and less than a second outer diameter of the second end portion 312. Stated another way, the second end portion 312 of the first flowbody 302 is cylindrical, and transitions proximate or near the first end portion 310 along the tapered portion 118 to the first end portion 310.

The first end portion 310 has the reduced first outer diameter for coupling the first flowbody 302 to a female connector or other connector associated with the fuel system of the gas turbine engine 98 (FIG. 1), for example, and for forming a fluid tight coupling between the first end portion 310 and the associated connector. The first end portion 310 defines a first perforated screen 320. The first perforated screen 320 extends from the first end portion 310 toward the second end portion 312. Generally, the first perforated screen 320 extends from a tip 326 of the first end portion 310 to proximate the tapered portion 118. In one example, the first perforated screen 320 includes a plurality of small holes or perforations 322. The first perforated screen 320 may also be inverted at the tip 326, such that the first perforated screen 320 forms an inverted cone at the tip 326, however, the first perforated screen 320 may have other shapes. In addition, the perforations 322 are illustrated as being substantially circular in shape, however, the perforations 322 may have any desired shape, such as a teardrop shape.

The flowpath 314 defined by the first end portion 310 extends from the tip 326 to the orifice 316 at the tapered portion 118. The first end portion 310 defines the second internal ramped surface 134. The second internal ramped surface 134 directs the fluid into the orifice 316 as the fluid flows in the second direction D2. The tapered portion 118 transitions the first end portion 310 to the second end portion 312. In this example, the tapered portion 318 is defined about the orifice 316. The orifice 316 is defined between the first end portion 310 and the second end portion 312 substantially in the tapered portion 118. Generally, the orifice 316 is a minimum inner diameter of a flowpath defined through the flow restrictor 300. The orifice 316 has a circular cross-section, and extends along the flowpath defined by the flow restrictor 300. The orifice 316 fluidly couples the first end portion 310 to the second end portion 312 along the flowpath of the flow restrictor 300. Generally, the flowpath of the flow restrictor 300 is defined by flowpaths 314, 414 of the respective first flowbody 302 and second flowbody 304 along the longitudinal axis L3 of the flow restrictor 300.

The second end portion 312 is substantially cylindrical. The second end portion 312 extends from the tapered portion 318 to the distal end 136 of the first flowbody 302. The second end portion 312 defines a counterbore 338 that extends along the flowpath 314 to an internal wall 340. The internal wall 340 is proximate or adjacent to the tapered portion 318. The orifice 316 is defined through the internal wall 340. The counterbore 338 includes the first tapered surface 144. The first tapered surface 144 is spaced is spaced apart from the internal wall 140 by a distance D30. The distance D30 is predetermined to enable the second flowbody 304 to be received within the first flowbody 302 in the coupled state 305. The first tapered surface 144 extends radially inward and axially along a portion of the counterbore 138 between the internal wall 140 and the distal end 136. In one example, the first tapered surface 144 extends for the distance D4, which is different and less than the distance D30. The first tapered surface 144 cooperates with the second flowbody 304 to fixedly coupled the second flowbody 304 to the first flowbody 302. Generally, in the uncoupled state, the counterbore 338 of the second end portion 312 has a second internal diameter between the distal end 136 and the first tapered surface 144 that is different and less than the third internal diameter between the distal end 136 and the first tapered surface 144 when the flow restrictor 300 is in the coupled state 305. In this regard, when the second flowbody 304 is coupled to the first flowbody 302, the second flowbody 304 expands the second end portion 312 of the first flowbody 302 to form the fluid-tight fit between the first flowbody 302 and the second flowbody 304. In other words, the second flowbody 304 physically deforms the second end portion 312 of the first flowbody 302 during installation to create the fluid-tight fit between the first flowbody 302 and the second flowbody 304. The second end portion 312 of the first flowbody 302 may also include one or more external coupling features, such as the one or more grooves 148.

The second flowbody 304 includes a third end portion 410, the fourth end portion 212 opposite the third end portion 410 and defines a flowpath generally indicated by reference numeral 414 between the third end portion 410 and the fourth end portion 212 along the longitudinal axis L3 of the flow restrictor 300. The second flowbody 304 is substantially circular in cross-section, and the third end portion 410 has a third outer diameter that is different and less than the fourth outer diameter of the fourth end portion 212. Stated another way, the fourth end portion 212 of the second flowbody 304 is cylindrical, and transitions proximate or near the fourth end portion 212 along the tapered portion 218 to the third end portion 410.

The third end portion 410 has the reduced third outer diameter for coupling the second flowbody 304 to the first flowbody 302. Generally, the third end portion 410 has a geometry similar to the first end portion 310 of the first flowbody 302 to minimize losses as the flow passes through the flow restrictor 300 in either direction. The third end portion 410 defines a second perforated screen 420. The second perforated screen 420 extends from the third end portion 410 toward the fourth end portion 212. Generally, the second perforated screen 420 extends from a second tip 426 of the third end portion 410 to proximate the tapered portion 218. In one example, second perforated screen 420 includes a plurality of small holes or perforations 422. The perforations 422 are illustrated as being substantially circular in shape, however, the perforations 422 may have any desired shape, such as a teardrop shape.

With reference back to FIG. 3, the flowpath 414 defined by the third end portion 410 extends from the second tip 426 to the tapered portion 218. At the second tip 426, the flowpath 414 expands along a third internal ramped surface 432 when the fluid flows in the second direction D2. The third internal ramped surface 432 extends at an angle of about 45 degrees relative to the circumference 410*a* of the third end portion 410 to terminate at the second tip 426.

The tapered portion 218 transitions the third end portion 410 to the fourth end portion 212. The fourth end portion 212 extends from the tapered portion 218 to the distal end 236 of the second flowbody 304. The fourth end portion 212 defines the bore 238 that extends along the flowpath 414 to the second tip 426. The fourth end portion 212 also includes the second tapered surface 244 defined about an outer perimeter or external circumference 212*a* of the fourth end portion 212. The second tapered surface 244 extends radially outward and axially along the circumference 212*a*. In one example, the second tapered surface 244 extends for the distance D5, which is different and less than the distance D4. The second tapered surface 244 is tapered in a direction opposite the first tapered surface 144 of the first flowbody 302. The different tapers 144, 244 cooperate to fixedly couple the second flowbody 304 to the first flowbody 302. The fourth outer diameter is different and greater than the second internal diameter of the second end portion 312 of the first flowbody 302 such that the coupling of the second flowbody 304 to the first flowbody 302 results in a physical deformation of the second end portion 312 of the first flowbody 302 and expands the second end portion 312 to the third internal diameter in the coupled state.

In one example, the first flowbody 302 and the second flowbody 304 are each additively manufactured, via DMLS, laser powder bed fusion, for example. Each of the first flowbody 302 and the second flowbody 304 are printed in a direction that corresponds to the first direction D1 of FIG. 8. Any debris, such as unsintered or loose material, etc. created during the manufacture of the first flowbody 302 and/or the second flowbody 304 may be easily cleaned from the respective first flowbody 302 and/or the second flowbody 304 via washing or pneumatic spraying, for example. This ensures that the first perforated screen 320 and the second perforated screen 420, along with the orifice 316, are clear of debris prior to assembly of the second flowbody 304 to the first flowbody 302. In addition, by providing the second flowbody 304 separate and discrete from the first flowbody 302, the orifice 316 may be visually inspected prior to assembly.

In order to assemble the second flowbody 304 to the first flowbody 302, in one example, with the flow restrictor 300 in the uncoupled state, the first end portion 310 of the first flowbody 302 may be coupled to a female connector, for example, of the fuel system. The third end portion 410 of the second flowbody 304 is inserted into the counterbore 338 of the second end portion 312 of the first flowbody 302. The second flowbody 304 is advanced in the direction D1 until the tapers 144, 244 engage. The continued advancement of the second flowbody 304 into the counterbore 338 causes the second end portion 312 to expand to the third inner diameter due to the differences in the fourth outer diameter of the fourth end portion 212 and the second internal diameter of the counterbore 338 to place the flow restrictor 300 in the coupled state and the second end portion 312 at the third internal diameter. The deformation in the first flowbody 302 caused by the second flowbody 304 creates a fluid-tight seal between the first flowbody 302 and the second flowbody 304. With the flow restrictor 300 in the coupled state, a connector may be coupled to the second end portion 312 of the first flowbody 302 and the flow restrictor 300 may be fluidly coupled in a fluid-tight manner to the fuel system associated with the gas turbine engine 98, for example.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A flow restrictor, comprising:

a first flowbody defining a first end portion, a second end portion opposite the first end portion and an orifice between the first end portion and the second end portion, wherein the first end portion has a first circular wall defining a plurality of first slots spaced from each other around the first circular wall, wherein the first slots are shaped and disposed on the first circular wall to swirl fluid flowing through the first slots, and wherein the second end portion defines a counterbore having a first diameter; and a second flowbody having a second circular wall defining a plurality of second slots spaced from each around the second circular wall, and having a second diameter proximate the plurality of second slots that is greater than the first diameter of the first flowbody, and the second flowbody is configured to be received within the counterbore of the first flowbody.

2. The flow restrictor of claim 1, wherein the second flowbody includes a third end portion and a fourth end portion opposite the third end portion, and the plurality of second slots are defined through the third end portion.

3. The flow restrictor of claim 2, wherein the second diameter is an external diameter of the fourth end portion.

4. The flow restrictor of claim 1, wherein each first slot of the plurality of first slots has the same orientation relative to a longitudinal axis of the flow restrictor.

5. The flow restrictor of claim 1, wherein the plurality of first slots and the plurality of second slots each have the same shape and orientation relative to a longitudinal axis of the flow restrictor so that both the first and second slots swirl fluid flowing through the first and second slots, respectively.

6. The flow restrictor of claim 1, wherein the plurality of first slots are spiral slots that wrap around a longitudinal axis of the flow restrictor at a first angle.

7. The flow restrictor of claim 6, wherein the plurality of second slots are spiral slots that wrap around the longitudinal axis at a second angle, and the second angle is the same as the first angle.

8. The flow restrictor of claim 6, wherein each first slot of the plurality of first slots has a first start point and a first end point, and the first start point of each first slot of the plurality of first slots is the same.

9. The flow restrictor of claim 8, wherein the first end point of each first slot of the plurality of first slots is different.

10. The flow restrictor of claim 8, wherein the first start point of each first slot of the plurality of first slots is a tip of the first end portion of the first flowbody.

11. The flow restrictor of claim 1, wherein the counterbore defines a first tapered surface, the second flowbody defines a second tapered surface configured to contact the first tapered surface to couple the second flowbody to the first flowbody in a coupled state.

12. The flow restrictor of claim 11, wherein in the coupled state, the plurality of second slots are proximate the orifice.

13. The flow restrictor of claim 1, wherein the plurality of first slots are defined through the first end portion so as to be spaced apart about a circumference of the first end portion.

14. A flow restrictor, comprising:

a first flowbody defining a first end portion, a second end portion opposite the first end portion and an orifice between the first end portion and the second end portion, wherein the first end portion has a first circular wall defining a plurality of first slots spaced from each other around the first circular wall, wherein the first slots are shaped and disposed on the first circular wall to swirl fluid flowing through the first slots, and wherein the second end portion defines a counterbore having a first diameter in an uncoupled state; and a second flowbody configured to be coupled to the first flowbody, wherein the second flowbody has a second circular wall defining a plurality of second slots spaced from each around the second circular wall, wherein the second slots are shaped and disposed on the second circular wall to swirl fluid flowing through the second slots, wherein the second flowbody has a second diameter proximate the plurality of second slots that is greater than the first diameter, wherein the second flowbody is received within the counterbore of the first flowbody in a coupled state and configured to expand the second end portion to a third diameter in the coupled state.

15. The flow restrictor of claim 14, wherein the second flowbody includes a third end portion and a fourth end portion opposite the third end portion, the plurality of second slots are defined through the third end portion and the second diameter is an external diameter of the fourth end portion.

16. The flow restrictor of claim 14, wherein the plurality of first slots and the plurality of second slots each have the same orientation relative to a longitudinal axis of the flow restrictor.

17. The flow restrictor of claim 14, wherein the plurality of first slots are spiral slots that wrap around a longitudinal axis of the flow restrictor at a first angle, the plurality of second slots are spiral slots that wrap around the longitudinal axis at a second angle, and the second angle is the same as the first angle.

18. The flow restrictor of claim 17, wherein each first slot of the plurality of first slots has a first start point and a first end point, the first start point of each first slot of the plurality of first slots is the same and the first end point of each first slot of the plurality of first slots is different.

19. The flow restrictor of claim 18, wherein the first start point of each first slot of the plurality of first slots is a tip of the first end portion of the first flowbody.

20. The flow restrictor of claim 14, wherein the counterbore defines a first tapered surface, the second flowbody defines a second tapered surface configured to contact the first tapered surface to couple the second flowbody to the first flowbody in the coupled state, and in the coupled state, the plurality of second slots are proximate the orifice.

* * * * *